US007978219B1

(12) United States Patent
Imes

(10) Patent No.: US 7,978,219 B1
(45) Date of Patent: Jul. 12, 2011

(54) DEVICE, NETWORK, SERVER, AND METHODS FOR PROVIDING DIGITAL IMAGES AND ASSOCIATED PROCESSING INFORMATION

(76) Inventor: Kevin Reid Imes, Pflugerville, TX (US)

(*) Notice: Subject to any disclaimer, the term of this patent is extended or adjusted under 35 U.S.C. 154(b) by 1067 days.

(21) Appl. No.: 09/943,632

(22) Filed: Aug. 30, 2001

Related U.S. Application Data

(60) Provisional application No. 60/229,019, filed on Aug. 30, 2000.

(51) Int. Cl.
*H04N 5/225* (2006.01)

(52) U.S. Cl. ................ 348/207.1; 348/207.99; 348/552; 348/211.99; 348/211.1; 348/211.2

(58) Field of Classification Search ............... 348/207.1, 348/207.99, 552, 211.99–211.4, 14.01–14.04; 455/95, 100
See application file for complete search history.

(56) References Cited

U.S. PATENT DOCUMENTS

| | | | | |
|---|---|---|---|---|
| 5,737,491 | A | 4/1998 | Allen et al. | 395/2.79 |
| 5,983,229 | A | 11/1999 | Houchin et al. | 707/100 |
| 6,031,497 | A | 2/2000 | Nam | |
| 6,038,295 | A | 3/2000 | Mattes | 379/93.25 |
| 6,074,111 | A | 6/2000 | Kasahara | 400/76 |
| 6,084,911 | A | 7/2000 | Ishikawa | 375/240 |
| 6,147,598 | A | 11/2000 | Murphy et al. | |
| 6,278,884 | B1 | 8/2001 | Kim | |
| 6,282,362 | B1 | 8/2001 | Murphy et al. | |
| 6,321,158 | B1 | 11/2001 | DeLorme et al. | |
| 6,377,825 | B1 | 4/2002 | Kennedy et al. | |
| 6,507,362 | B1 | 1/2003 | Akerib | |
| 6,522,889 | B1 | 2/2003 | Aarnio | |
| 6,525,768 | B2 | 2/2003 | Obradovich | |
| 6,526,335 | B1 | 2/2003 | Treyz et al. | |
| 6,535,243 | B1 | 3/2003 | Tullis | |
| 6,542,191 | B1 | 4/2003 | Yonezawa | |
| 6,559,882 | B1 | 5/2003 | Kerchner | |
| 6,567,122 | B1 * | 5/2003 | Anderson et al. | 348/211.3 |
| 6,573,927 | B2 * | 6/2003 | Parulski et al. | 348/32 |
| 6,628,325 | B1 | 9/2003 | Steinberg et al. | |
| 6,636,259 | B1 | 10/2003 | Anderson et al. | |
| 6,642,959 | B1 | 11/2003 | Arai | |
| 6,715,003 | B1 * | 3/2004 | Safai | 710/33 |
| 6,762,791 | B1 * | 7/2004 | Schuetzle | 348/231.3 |
| 6,763,247 | B1 | 7/2004 | Höllstrom et al. | |
| 6,831,754 | B1 | 12/2004 | Delaney | |
| 6,833,865 | B1 | 12/2004 | Fuller et al. | |

(Continued)

FOREIGN PATENT DOCUMENTS

WO WO 99/52259 10/1998

OTHER PUBLICATIONS

U.S. Appl. No. 09/874,423, filed Jun. 4, 2001.

(Continued)

*Primary Examiner* — Yogesh Aggarwal
(74) *Attorney, Agent, or Firm* — Larson Newman, LLP

(57) ABSTRACT

A wireless communication device operable as a digital image capturing device (wireless digital camera) may be used to associate processing information with a captured image. The wireless communication device may communicate information to a network server, such as a WAP server and/or a process server for processing. A process associated with the communicated information is identified and initiated to process the information.

25 Claims, 8 Drawing Sheets

U.S. PATENT DOCUMENTS

| | | | | |
|---|---|---|---|---|
| 6,930,709 | B1 | 8/2005 | Creamer et al. | |
| 6,965,398 | B2 | 11/2005 | Arakt | |
| 6,968,365 | B2 | 11/2005 | Höllstrom et al. | |
| 6,977,680 | B1 * | 12/2005 | Ichihara | 348/231.99 |
| 6,980,232 | B2 | 12/2005 | Suzuki | |
| 7,062,230 | B1 * | 6/2006 | Ishiguro et al. | 455/91 |
| 7,111,317 | B1 | 9/2006 | McIntyre et al. | |
| 7,173,651 | B1 | 2/2007 | Knowles | |
| 7,372,485 | B1 | 5/2008 | Bodnar et al. | |
| 7,701,490 | B2 | 4/2010 | Ward et al. | |
| 2002/0030745 | A1 | 3/2002 | Squilla et al. | |
| 2003/0041110 | A1 | 2/2003 | Wencur et al. | |
| 2003/0065805 | A1 | 4/2003 | Barnes | |
| 2003/0142215 | A1 | 7/2003 | Ward et al. | |

OTHER PUBLICATIONS

U.S. Appl. No. 09/943,629, filed Aug. 30, 2001.
Office Action dated Apr. 26, 2010, U.S. Appl. No. 09/874,423.
Office Action dated Feb. 11, 2005, U.S. Appl. No. 09/943,629.
Office Action dated Jul. 29, 2010, U.S. Appl. No. 09/943,629.
"Sony Global—Press Release, Sony Announces New VAIO Notebook Computer," Sep. 3, 1998 http://www.sony.net/SonyInfo/News/Press_Archive/199809/98-085/index.html.

* cited by examiner

DEVICE, NETWORK, SERVER, AND METHODS FOR PROVIDING DIGITAL IMAGES AND ASSOCIATED PROCESSING INFORMATION

Priority is claimed under 35 U.S.C. Section 119/120 based on filing in the U.S. for Provisional Patent Application Ser. No. 60/229,019 filed on Aug. 30, 2000.

TECHNICAL FIELD

The present invention generally relates to processing information, and more particularly, to a device, network, server and methods for providing digital images and associated processing information.

BACKGROUND

Advancements in photography have brought about a need for novel methods for processing digital images. The digital camera, though in its infancy, may nearly replace conventional imaging techniques as advancements in digital imagery proliferate. The development of digital photography includes creating high quality single shot images using a CCD (Charge-Coupled Device) chip which houses thousands of "sensors" sensitive for red, green and blue light. Via interpolation, a built-in or external computer recalculates the original color of each pixel.

A large problem to overcome for camera designers is the resolution of the CCD. More "sensors" mean higher resolutions, but it's technical difficult to create CCD chips with larger surfaces (larger "negative" format) with more "sensors". The last few years have brought a breakthrough and resolution is becoming acceptable for professional use. Modern CCD's on 6×6 cm "neg." format are housing up to 6,000,000 pixels, enough for A4 output.

During use, light passes through the lens of a digital camera the same way it does a regular camera. Instead of being focused on photographic film, the image is focused on a chip called a charge-coupled device (CCD). The top of the CCD is covered with transistors that create electrical currents in proportion to the intensity of the light striking them. The transistors make up the pixels of the image. A pixel is the minimum, distinct visual piece of information that a component can display or capture. The pixel can be made up of only one transistor for black and white photography or several transistors for color. The more pixels in an image, the better the resolution. The transistors create a continuous, analog electrical signal that goes to an analog-to-digital converter (ADC). The ADC is a chip that translates the varying signal to a digital format, which consists of a continuous stream of 1's and 0's.

The ADC sends the digital information to a digital signal processor (DSP) that has been programmed specifically to create photographic images. The DSP adjusts the contrast and detail in the image, compresses the data that makes up the image so that it takes up less storage space, and sends the data to the camera's storage medium.

SUMMARY

In accordance with teachings of the present invention, a device, network, server and methods for providing digital images and associated processing information are provided.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The conceptual groundwork for the invention involves communicating information associated with digital images between at least one device and at least one network. According to one aspect of the invention, image information may be recorded using a digital image capturing device (digital camera) and communicated to a network for processing. An identifier may be associated with the image information for processing the image information.

In a particularized form, a wireless communication device operable as a digital image capturing device (wireless digital camera) may be operable to associate a processing reference with a image information. As such, the wireless communication device may communicate information including a reference associated with processing the information to a destination such as a client, device, network location, server, agent, process, etc. operable to process the communicated information.

Figure 1:
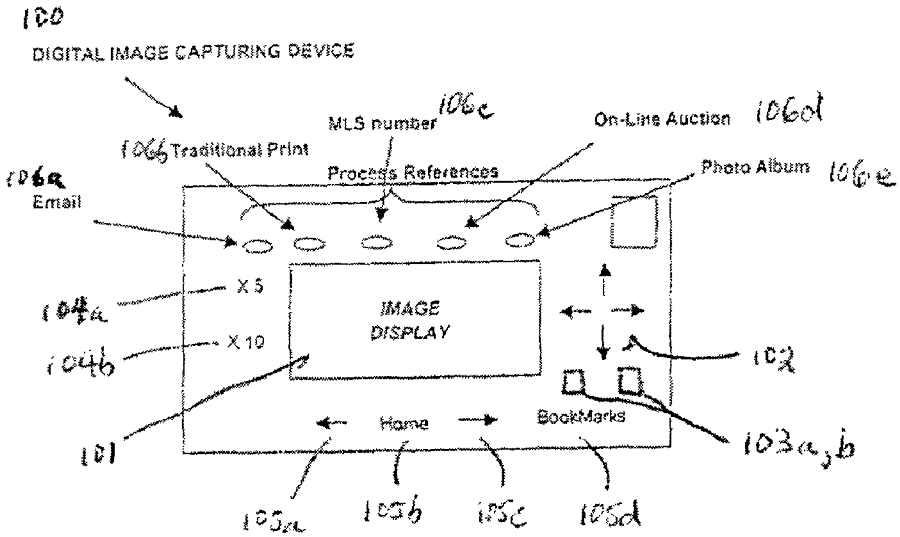
FIG. 1 illustrates a diagram of a digital image capturing device operable to associate processing information with image information according to one aspect of the invention.

FIG. 1 illustrates a diagram of a digital image capturing device operable to associate processing information with image information according to one aspect of the invention. A digital image capturing device (DICD) 100 may include a digital camera or other devices or combination of devices that may be used to capture image information such as wireless telephones, network terminals, personal digital assistants, portable computing devices, or other electronic devices or combinations of devices, cameras, adapters, modules, etc. that may be operably associated with capturing digital images.

A digital image capturing device (DICD) 100 may include a display 101 such as an active matrix, LCD, or the like operable to display information such as digital images and text. DICD 100 further includes an input device such as a pointing device 102, selection buttons 103*a* and 103*b*, magnification selections 104*a* and 104*b*, and network browser buttons 105*a-d* for navigating a network such as the Internet. DICD 100 may also include pre-programmed and/or programmable function buttons 106*a-e* for associating process reference(s) with image information. Process references may include an email reference 106*a*, a traditional print reference 106*b*, a multiple listing (MLS) reference 106*c*, an on-line auction reference 106*d*, a photo-album reference 106*e* or other references that may be used to associate a process with a image information.

In one form, a reference may be automatically associated with a captured digital image based on an application used to capture a digital image. For example, DICD 100 may be operable to provide traditional prints of captured digital images. As such, additional functionality or process references may not be needed for processing image information. In this manner, a reference identifying a traditional print process may be automatically associated with a captured digital image for converting image information into a traditional print. For example, a reference may include an identifier operable to identify an image, an exposure #, a device I.D., a user, a print process, etc. to process the captured images into traditional prints for a user.

Though illustrated as physical programmable buttons, process references 106*a-e* may be provided via a user interface operably associated with DICD 100. For example, a user interface may be displayed within image display 101 and process references may operably associated with the user interface within a menu, as one or more icons, and/or as other input objects that may be used in association with identifying a process for processing image information.

Display 102 may include a touch screen operable to allow selection of icons, fields, user interfaces, etc. that may be displayed within display 102. Additionally, DICD 100 may further include an input device such as a scribe (not expressly shown) for selecting regions displayed within display 102. DICD 100 may further include an audio input port (not expressly shown) to allow a user to associate an audio message or file image information.

DICD 100 may include one or more processors operable to process image information. For example, DICD 100 may include an image processor operable to record digital and a communication processor operable to communicate image information and associated process information. The processors may be integrated as a single chip or as a "system-on-a-chip" for communicating image information having associated process information.

In one embodiment, a communications module (not expressly shown) coupled to DICD 100 may include a code division multiple access and advanced mobile phone system (CDMA/PCS/AMPS) cellular technology for wirelessly communicated digital information. Qualcomm's Mobile Station Modem (MSM™) chipset and system software may include a MSM3300 single-chip baseband processor modem that interfaces directly with the IFR3300™, RFR3100™ and RFT3100™ chips, and the PM1000™ power management chip. The MSM3300 chipset and system software may include advanced technologies such as global position location and Bluetooth, as well as multimedia features such as Qtunes™ MP3 player software and Compact Media Extension (CMX™) MIDI based multimedia software. The MSM3300 device integrates both digital and analog functions on a single chip. The low-power, low-cost MSM3300 includes an ARM7TDMI™ RISC microprocessor, and Qualcomm's powerful QDSP2000™ digital signal processor core, which enables a host of advanced multimedia features.

The MSM3300 and associated chipset includes a MSM3300 modem, a RFT3100 analog-baseband-to-RF upconverter, a IFR3300 IF-to-baseband downconverter, a RFR3100 RF-to-IF downconverter and a PM1000 power management ASIC. During use, the MSM3300 performs baseband digital signal processing and executes the subscriber unit system software and serves as the central interface device in the subscriber unit, connecting RF and baseband circuits as well as memory and user interface features. The MSM3300 device also includes complete digital modulation and demodulation systems for both CDMA and AMPS cellular standards as specified in IS-95A and IS-95B. The subscriber unit system software controls most of the functionality and activates the features of the subscriber unit. System software is executed by an embedded ARM7TDMI microprocessor within the MSM3300 device.

DICD 100 may further include global positioning capabilities for providing location information for DICD 100. One such technology may include Qualcomm's gpsOne™ Technology which may be associated with the MSM3300 Chipset. The gpsOne position location technology merges Global Positioning System (GPS) satellite and network information. DICD 100 utilizing a GPS module such as gpsOne collects measurements from a GPS constellation and a cellular/PCS network and sends the information to the Position Determination Entity which optimizes the position location calculation based on existing information.

DICD 100 may also include a Bluetooth wireless communication module. Bluetooth is a Global Specification for Wireless Connectivity and allows replacement of various cables that connect one device to another using a universal short-range radio link. For example, Bluetooth radio technology built into both a cellular telephone and a laptop would replace the cumbersome cable used today to connect a laptop to a cellular telephone. Printers, PDAs, desktops, fax machines, keyboards, joysticks and virtually any other digital device can be part of the Bluetooth system. In addition to untethering devices by replacing the cables, Bluetooth radio technology provides a universal bridge to existing data networks, a peripheral interface, and a mechanism to form small, private ad hoc groupings of connected devices away from fixed network infrastructures. The Bluetooth air interface is a frequency-hopping Gaussian Frequency Shift Keying (GFSK) modulation in the unlicensed 2.4 GHz ISM band. The modulation rate is 1 Mbps, and its architecture offers a low-cost, simple radio solution. The Bluetooth baseband functionality may be incorporated into the DICD device and may be operable to CDMA baseband processing to facilitate dial-up networking with a global network such as the Internet.

DICD 100 may also include a Universal Serial Bus (USB) for faster data transfers between wireless communicators and other data devices. DICD 100 may provide Internet Protocol (IP) stack support and a Wireless Application Protocol (WAP) browser interface for full Internet connectivity. DICD 100 may also include a User Interface PureVoice VR™ speaker-dependent and speaker-independent Voice Recognition for providing voice commands for DICD functions and features.

DICD 100 may also include an interface card such as Qualcomm's Subscriber Identity Module/Removable Universal Identity Module (SIM/RUIM) card interface allowing compatibility with third-party PDA operating systems and applications. DICD 100 may use a Java Digital CMOS Image (DCI) sensor for image capture and a Color Liquid Crystal Display (LCD) driver to allow viewing of both still and moving images in full color. A Storage Multimedia Card (MMC)

interface, enabling addition of high-capacity removable memory for storage of data such as electronic maps, music and images, as well as for transfer of data to and from PCs and consumer devices.

During use, a user may capture an image using the DICD 100 and a user may select process reference for processing a captured digital image. For example, a user may want to email a digital image. As such, a user may select email reference 106*a* and DICD 100 may associate a reference with the image information. A user may also enter text information and/or provide an audio message to associate with the image information. As such, image and associated information and an email reference may be communicated to a destination and processed using the email reference.

In one embodiment, DICD 100 may be a wireless communication device operable to communicate with a network such as the Internet or an Intranet. DICD 100 may be operable to wirelessly receive and communicate information associated with the Internet using a wireless communication protocol or application such as WAP or other protocols or applications operable to facilitate wireless communication. In this manner, a user may navigate or access the Internet or an Intranet using forward button 105*a*, back button 105*c*, home button 105*b*, favorite button 105*e*, or other graphical user interface elements that may be displayed with image display 101.

DICD 100 may further include software and hardware operable to allow a user to browse the Internet and access selective information in a desirable manner. For example, a user may access a website operable to receive information representing digital images. A user may preview images and communicate desired images to a website operable to receive information representing an image. Additionally, DICD 100 may further include functionality to allow a user to update/author a website using DICD 100. In this manner, a user may capture an image and associate the image with a webpage thereby reducing the amount of time required to upload an image an author the webpage via a terrestrial or conventional land-line system.

Through providing DICD 100 as a wireless enabled device, a user may be able to initiate processing of an image without having to access a hard-line, landline, conventional personal computer, etc. For example, DICD 100 may initiate a request to update print photos using a localized printer or using a network printer operable to process images into traditional prints, store images on a personal computer and/or within an on-line photo album, dynamically generate/update a website, email images, or other processes that may be used to process image information.

In one embodiment, DICD 100 may operable to access the Internet to view property listings displayed at a network location or website. For example, a user may browse listings displayed within user interface 101 of DICD 100. In this manner, DICD 100 may be used to provide image information for a website and preview image information that may be associated with a particular website and/or author information that may be communicated for creating/updating a listing, flyer, etc.

In another embodiment, a user such as a real estate professional, may use DICD 100 to capture images of a new, existing, potential listing or property and may associate a reference with image information for a for processing the image information when communicated to a destination. For example, DICD 100 may associate a reference, such as a multiple sales listing (MLS) number, to one or more images. The image information associated with the images and the reference may be communicated to a destination for processing. For example, the image information may be displayed within one or more on-line MLS listings that provide information associated with property or real estate for sale. In this manner, a real estate agent can associate a reference, such as an MLS number for a property, and upon DICD 100 communicating the image information and the reference, one or more MLS listings that may display properties via a network (such as the Internet) may be updated to include image information for a specific MLS number. As such, several websites may be updated to include listing information such as images or other associated listing information for a property.

In another embodiment, other information (i.e. address, inventory number, etc.) in addition to or in place of an MLS number may be used to identify and/or enhancing listing and/or other information associated with providing a listing. For example, DICD 100 may be operable to allow a user to input text or notes for a listing using a user interface displayed within display 101 and operable to enable input (not expressly shown). In this manner, additional information such as listing information, notes, selling features, etc. specific to a property may be input and associated with a listing.

In one embodiment, DICD 100 may be used as a listing assistant operable to allow a user to input listing information for generating a listing. For example, a user interface may be include a template for inputting information to create a property listing. As such, a user may input detail of a property (i.e. number of bedrooms, baths, stories, property type, etc.) and association additional information such as image information and notes with the listing information. In this manner, DICD 100 may be communicate the information for one or more listings for creating/updating listing information at a destination such as a network location, website, personal computer, flyer generator, periodical generator, database or other locations or processes that may advantage use information communicated by DICD 100.

In another embodiment, listing information may be input, received and/or stored within memory associated with DICD 100 and used to generate a layout or map of a property. For example, DICD 100 may include a program of instructions for displaying layout of a floor plan of a property within user interface 101. For example, the number of bedrooms, bathrooms, kitchens, dining rooms, living rooms, etc. may be displayed within user interface. As such, a user may select a room as they tour a property and capture an image and associate a note with the selected room. In this manner, a reference to a specified room may be associated with image information and additional information that may be included based on the selected room. In this manner, upon DICD 100 communicating the listing information and associated image information and notes to a network location, a website, listing, flyer, advertisement, etc. may be updated/created to include information specific to a portion or location of a property. For example, a website may include references, links, etc to specific portions of a property and image and other information may be provided as needed.

Although illustrated as a dynamically generated floor plan, certainly other embodiments may include DICD 100 having predetermined floor plans that may be displayed within user interface 101 and selected for associating image information. For example, DICD 100 may be operable to periodically receive floor plan information for a specific property and as such may allow a user to capture images and input image information using a floor plan specific to a user of DICD 100.

In one embodiment, DICD 100 may include a global position communications module (not expressly shown) operable to provide GPS co-ordinates associated with DICD 100. For example, a reference identifying a global position may be associated with image information for processing. Associating a global position with a captured digital image may allow for several applications which may utilize global position information in association with processing image information. For example, a surveyor may capture image information and associate a GPS reference with the captured image information. In this manner, the image information may be communicated to a network and processed using the GPS reference as needed. Other applications for associating global position data may include construction, military applications, geology, or other industries that may use image information and associated GPS coordinate information.

In one embodiment, GPS coordinates may be used in association with processing property information for the real estate industry. For example, GPS coordinates may be associated with image information and communicated to a network for processing. As such, a network server may determine the location of the property (i.e. physical address) and update and/or create a property listing. In another embodiment, an MLS number for an image having a GPS coordinate may be determined. For example, a physical street address may be determined using the GPS coordinates and an associated MLS number may be determined based upon the street address. In this manner, image information for a specific MLS number may be processed and displayed within a website, an on-line MLS listing, a classified advertisement, etc.

In one embodiment, DICD 100 may be programmed or re-programmed for additional/updated functionality. For example, a new process or information associated with a new process, may be communicated to DICD 100 (via a wireless network, a wireline network, or a combination of networks) and stored within memory associated with DICD 100. In this manner, the DICD may be remotely reprogrammed expanding/updating the functionality of the DICD thereby enabling the DICD to be configured or re-configured as needed.

For example, DICD 100 may be coupled to a communication bus operably associated with a computer system (not expressly shown). Image information and associated process information may be copied an/or transferred to the computer system and stored with a storage medium. The information may then be processed by the computer system based on processing information associated with the image information and/or communicated to a network system or server operable to process the information. In this manner, either a computer system and or network server may be used to process the image information.

In one embodiment, DICD 100 may be coupled to a communication port (not expressly shown) operable to communicate directly with a network location such as the Internet or an Intranet. The communication port may be integrated as a part of DICD 100 or may be realized as a separate component that may be used by DICD 100. As such, the communication port and may include hardware and/or software operable to communicate image information and associated process information one or more network destinations as determined by a process reference. For example, the communication port may be operable to communicated using a protocol such as TCP/IP, FTP, or other communication protocols. As such, image information having more than one associated process may be communicated to plural destinations based on associated process reference(s). In this manner, a personal computer may not be needed to communicate image information and associated process information to a destination.

In another embodiment, DICD 100 may be realized as a PDA operable to capture images and communicate using a communication port or adapter operably associated with the communication port for communicating and/or synchronizing information between a personal computer and/or network system. For example, a user may couple DICD operable as a PDA to a communication adapter and initiate communication with a personal computer or network location by selecting a button or graphical icon operably associated with the PDA. In this manner, image information and process information may be communicated to a destination for subsequent processing. For example, a website may be dynamically generated based on a process reference associated with an image. As such, a user may update/generate a website by coupling DICD 100 to a communication port.

In another embodiment, DICD 100 may copy/transfer image information and associated process information to a personal computer for processing. For example, a personal computer may include a communication device operable to communicate with a network, printer, storage medium, etc. As such, upon communicating image information and associated process information to a personal computer, a process may be deployed to process the image information. For example, a user may have selected an image to print when communicated to the personal computer. In another embodiment, a process may include generating code using mark-up language operable to be viewed by a network browser. As such, webpages or frames that may use image information may be generated by the personal computer. In another embodiment, the image information may be stored in a temporary location until network service is available. For example, the images may be stored in a particular directory and upon network becoming available, the images may be transferred to a network location based on associated processing information. As such, one or more processes may be initiated upon DICD 100 communicating image information and associated process information to a personal computer and/or network location.

In one embodiment, image information and an associated reference may be communicated to a network for processing via a land-line, wire-line, etc. modem operably associated with DICD 100. For example, wireless service may not be available for wirelessly communicating image information having an associated reference. As such, DICD 100 may be operable to communicate in a client-server mode for communicating the image information and an associated reference for processing the image information.

In one embodiment, one or more components may be used to provide communication of image information having associated processing information. For example, a communication module operable to communicate information via a network may be operably coupled to DICD 100 for communicating image information having associated reference for processing. For example, a communication module may be coupled to a communication port operably associated with DICD 100. In this manner, an external communication module may communicate image information and an associated reference.

In one embodiment, DICD 100 may be operable as an access device that may include a PDA to help facilitate access to a property or residence. One example of an access device may include a Supra "e-Key" manufactured by SUPRA, an Interlogix Inc. company. For example, DICD 100 may include a PDA comprised of a database of property listing information associated with providing access to a property. The PDA may include a wireless communication port operable to communicate access information to a receiver unit coupled to a portion of a property for allowing access using a key or unlocking mechanism. The database may be periodically loaded or updated allowing new listings to be added and old listings to be removed. The PDA may be used with an image capturing device operably coupled to the PDA to provide DICD 100 operable to capture image information.

For example, the PDA may be used to provide access to a property and using a digital camera attachment may also be used to capture image information of the property. As such, a real estate professional or user may capture image information and communicate image to a system and/or network. In this manner, image information for a property and listing information (if desired) may used in association with an email, a zip (compressed) file, listings, generating webpages or updating a website, etc. In one embodiment, the PDA including the database of listing information may be used in association with an application operable to capture images for generating a website.

For example, a camera module may be coupled to the PDA to provide DICD 100 and an application associated with the PDA and the camera module may be used to capture images as a client tours a property. A reference number associated with the property may be used with the application to identify tour information image information, listing information, etc. In this manner, DICD 100 may be used to communicate image information and listing information to a destination (i.e. webpages, websites, computer systems, servers, etc.) to create/update home tours for each client. Other features may also be provided in association with the PDA operable as an entry device for a property and may include, but are not limited to, generating listing information and associated image information, creating on-line listings, creating flyers, distributing listing information including image information and process information, or other processes and/or features that may be used to enhance a real estate transaction.

In one embodiment, the PDA operable as DICD 100 may be updated upon communicating with a system or network. For example, software applications and/or revisions may be uploaded to the PDA and used to capture image information when used as an image capture device. For example, the PDA may be operable to communicate with a network location to communicate updates for a database associated with providing listing or other information. As such, software application and/or updates may be communicated to the PDA (or a local installation program) to enhance the functionality of the PDA operable as an image capturing device. In this manner, a user may not be required to manually load software updates thereby reducing interaction required by a user.

Figure 2:
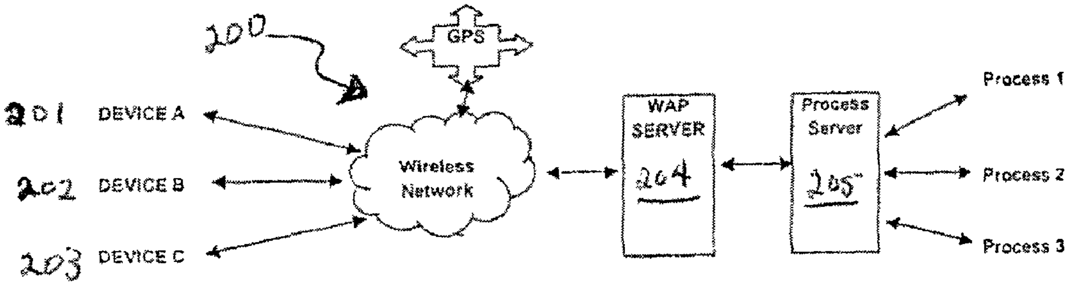
FIG. 2 illustrates a network for communicating digital image information including associated processing information according to one aspect of the invention.

FIG. 2 illustrates a network for communicating digital image information including associated processing information according to one aspect of the invention. Network 200 includes one or more wireless communication devices operable to communicated with a wireless network. Communication devices 201, 202, 203 may include one or more types of wireless devices operable to capture image information and communicate image information and associated processing information via a wireless network. One or more types of wireless communication may be used by the present invention wherein the wireless network is not limited to a single type of wireless communication and/or network.

Network 200 further includes a wireless application protocol (WAP) enabled server 204 operable to process wirelessly communicated information communicated via a wireless network. For example, first device 201 may be a WAP enabled device operable to communicate information using a WAP enabled server via a wireless network. Device 201 may communicate information via WAP server 204 operable to process information communicated to/from device 201. Network 200 further includes a process server 205 that may be coupled to a global communications network such as the Internet (not expressly shown) and operable to process information communicated by device 201, 202, 203. In this manner, information may be wirelessly communicated between a wireless communication device and the Internet and processed accordingly.

In one embodiment, one or more of devices 201, 202, 203 may include a digital image capturing device (DICD) operable to capture digital images and associate a process reference with the captured image. For example, image information and a reference may be wirelessly communicated via wireless network 200 to WAP server 204 operable to receive wirelessly communicated information. The image information and reference may then be communicated to process server 205 operable to process the image information using the reference associated with the image information. For example, process server 205 may determine an email process reference associated with a communicated image. As such, process server 205 initiate an email process for emailing an image to an appropriate email address. In another embodiment, process server 205 may determine a reference provided for processing the image information into traditional prints. As such, process server 205 may initiate a process for processing the image information into traditional prints.

In another embodiment, WAP server 204 and process server 205 may be realized as a single server or system. As such image information having processing information may be wirelessly communicated to a single server or system for initiating processing or image information.

In another embodiment, process server 205 may be operable to store image information for processing. For example, a database, such as an SQL database, may be used to store the communicated digital images and associated process references. As such, image information and an associated process reference may be identified and a database operably associated with processing the image information may be updated. For example, a process reference may be stored within a text file, binary encoded file, image file, associated with a captured image and communicated to process server 205. As such, a database operably associated with process server 205 may be updated and an associated process may be initiated if needed.

In one embodiment, a database may be used to store information for one or more websites and/or webpages that may be dynamically generated based on image information and associated process information. In this manner, image information and associated process information may be communicated to a network location for updating websites, webpages, associated database, etc. operable to use the communicated image information.

In one embodiment, a database may be operable to store information for processing associated image information into traditional prints. For example, device 202 may communicate twenty-five images prior to the process server communicating the twenty-five image to a network location operable to convert image information into traditional prints. In this manner, a predetermined number of exposures may be communicated within a single file for converting the image information into traditional prints.

In one embodiment, network 200 may include a global network such as the Internet and device 201, 202, 203 may be operable to communicate information via a landline operable to communicate information between a device and a network. In this manner, a user may couple device 201, 202, 203 to a network such as the Internet and communicate the information to a network location such as a website operable to receive information associated with digital images.

In one embodiment, several processes may be associate with a single image or image information and communicated via network 200. For example, WAP server and/or process server 205 may identify the one or more process associated with the image information and process the image information accordingly. For example, image information may be communicated to a network location operable to convert the information into a format operable to provide conventional photographs representing the recorded digital images. In another embodiment, the information may also be forwarded as an email to an email address. In another embodiment, the images may also be stored at a network location for future access by one or more users. As such, several processes may be associated with a single image and initiated as needed for processing the image information.

In one embodiment, network 200 may be operable to create and/or update a website using information associated with digital images and may be operable to use Java based objects for improved navigation, appearance, and functionality of the website. Java is an object oriented language which may be executed by a Java interpreter and run on most computers and operating systems such as UNIX, Macintosh OS, and Windows. Additionally, network 200 may be operable to utilize many different types of markup languages for accessing, providing, and/or communicating information associated with digital images. Markup languages may include, for example, hyper text mark-up language (HTML), extensible mark-up language (XML), wireless mark-up language (WML), etc. which may be used in association with various communication protocols such as Internet Protocol (IP), Transmission Control Protocol (TCP), Transmission Control/Internet Protocol (TC/IP), Wireless Application Protocol (WAP), etc. for communicating image information and/or associated references for processing images.

For example, network 200 may be operable to use TCP/IP and/or WAP communication in which a client terminal, such as wireless device, requests service (such as sending a Web page) by another computer, such as a server coupled via the network. In this manner, information associated with digital images may be communicated using TC/IP communication and/or WAP. In one embodiment, a webpage and/or website may be dynamically generated based on a user's request to access a webpage/website including the image information. For example, a user may login to a website and the webpage for the user may be dynamically generated by a process operably associated with generating a website for the specific user. In this manner, a webpage including the image information or references to the image information may not exist until a user request access to the webpage.

In one embodiment, process server 205 may aggregate information for device 201, 202, 203 and distribute image information to a destination base on processing associated with the destination, process reference and image information. For example, one or more templates may be operably associated with a destination and as such image information and other associated information may be formatted and communicated to a specific destination based on a template. In this manner, image information may be communicated to plural destinations based on a predetermined format. For example, image information may be resized, compressed, filtered, placed within an HTML page, etc. for one or more destinations. One example of destinations may include several websites operable as on-line auctions having predetermined guidelines for formatting information and image information. As such, several templates may be created for the on-line auctions and image information and associated information (pricing, descriptions, shipping information, etc.) may be processed using a template and communicated to a destination site based on the sites predetermined format.

In another embodiment, image information may be formatted and communicated based on a subscription or service. For example, real-state listing information and image information may be communicated to process server 204. A subscriber may access an updated list or obtain an updated list of real-estate listings communicated to server 204 and contact the listing agent to solicit the agent about distributing, promoting, advertising, etc. information associated with the new listing. Upon an agent confirming the solicitation, the subscriber may obtain a copy of the listing information including the image information for completing the transaction. In this manner, the listing information including the process information may be communicated to the subscriber in a desired format. For example, a listing agent may want to distribute a listing to an cable or network broadcast station that may have a real estate channel. As such, the listing information including the image information may be formatted if needed and communicated to a destination associated with the cable or network broadcast station.

Figure 3:
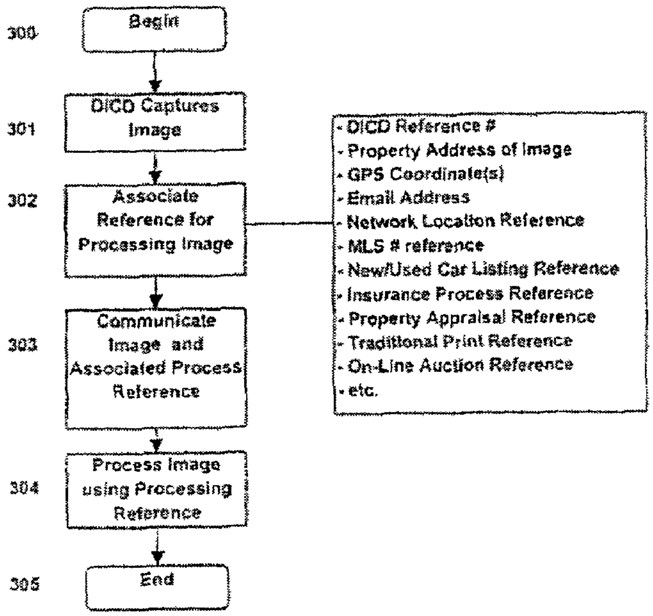
FIG. 3 illustrates a method for providing image information including associated processing information according to one aspect of the present invention.

FIG. 3 illustrates a method for providing image information including associated processing information according to one aspect of the invention. The method may be associated, in whole or in part, with a software routine operable to be employed by the device illustrated in FIG. 1, the network and/or devices illustrated in FIG. 2, or other systems, networks, or devices operable to use the method illustrated in FIG. 3.

The method begins generally at step 300. The method proceeds to step 301 where a digital image capturing device (DICD) captures an image for processing. The method proceeds to step 302 where a reference may be associated with the digital image before, during or after an image is captured. For example, a reference may include a device identifier operably associated with the DICD. As such, a reference identifying the DICD may be associated with the captured digital image such that image information may be identified upon being communicated to a network.

In another embodiment, one or more references may be associated with the image information for processing. Several references for processing image information may be used to advantageously provide efficient processing of image information. For example, a property address reference may be associated with the captured digital image. In another embodiment, a reference to a global position coordinate may be associated with the captured digital image thereby allowing a global position of the captured image to be provided and used in association with processing the digital image.

In another embodiment, a reference may be associated with image information and may be formatted and/or altered based on the associated reference. For example, a reference to update a website may be associated with an image. As such, an image may be compressed beyond a standard compression format (i.e. JPEG, GIF, etc.) based on the end use or process associated with the reference. For example, an image may be compressed to 50% of the original JPEG due to the end use of the image. Other types of processing may also be employed based on an end use of the image information. For example, an image may be filtered, resized to fit within an HTML page, copied, converted to a different color pallet, or other image processing that may be realized by the end use of the image.

In another embodiment, a reference for an email address may be associated with the captured digital image such that the captured digital image an email process may be associated with the captured digital image. In another embodiment, a reference to a network location may be associated with the captured digital image such the digital image may be communicated to a desirable network location.

In another embodiment, a real-estate agent may associate a reference to an MLS number to a captured digital image such that subsequent processing of the captured digital image may include updating or providing image information for an MLS listing.

In another embodiment, a reference to an inventory number for an asset, such as a new or used car, may be associated with a captured image. In this manner, a captured digital image representing an new or used car may be communicated to a network and processed and/or displayed using an associated reference to an inventory number.

In another embodiment, a reference to an insurance process may be associated with a captured digital for subsequent processing of a captured digital image such as claims processing, policy processes, etc. In one embodiment, a property appraiser may associate a reference to a captured digital image such that the communicated digital image may be processed. For example, an appraiser may capture several digital images for a single process. As such, a reference may be associated with the captured images for subsequent processing.

In another embodiment, a user may want a traditional print of the digital image. As such, a user may associate a reference with the digital image such that a subsequent process may provide the user a traditional print of the digital image.

In another embodiment, a user may want associate an on-line or Internet auction reference to a digital image. For example, a user may select the digital image to posted on an on-line auction for selling an item displayed within the digital image. In this manner, a user may automate uploading images for on-line auctions.

In one embodiment, a user may access list of references of processes that may be associated with processing image information. As such, a user may select one or more references to process(es) and associate the reference(s) with image information. In this manner, a user may customize processing of image information for a specific image.

In one embodiment, a user such as a real estate professional may include a process reference, such as a client name, preview reference, address, MLS number, new listing reference or other references that may be associated with an image. As such, one or more processes may be used to process image information for the real estate professional. For example, a real estate professional may show several properties to one or more clients allowing each client to take photos and add notes to each photo if desired. As such, a website, webpage, email(s), etc. including the image information and notes may be generated for each client.

Upon associating a reference, the method proceeds to step 303 where image information and associated reference may be communicated to a network such as a wireless communications network, the Internet, an Intranet, or other networks operable to communicate image information having an associated reference. For example, the information may be wirelessly communicated to a network using a wireless technology such as CDMA, TDMA, Bluetooth, GSM, or other wireless technologies for subsequent processing. However, in other embodiments, a conventional modem or landline may be used to communicate digital images having an associated reference for subsequent image processing. For example, a DICD may be operably associated with a device (i.e. PDA, mini-computer, network terminal, etc.) that may be coupled to a communication port and/or communication bus. As such, image information and associated process information may be communicated to a personal computer and/or network location for subsequent processing. For example, image information may be copied to a directory associated with a personal computer and a process may be employed to initiate communication with a network location. The process may be initiated upon the device finishing copying/transferring image information via a conduit or other process and may include establishing communication with a network using a transfer protocol such as an FTP, HTTP, TCP/IP or other protocol to communicate image information and associated process information. The process may be initiated via a 'browserless' environment without the user having to manually upload, transfer, copy, etc. information from the personal computer to the network location. In this manner, an efficient transfer of image information and associated process information may be uploaded to a network location for the user.

In one embodiment, the DICD or device may transfer a program of instructions from the DICD to the personal computer to initiate communication with a network. For example, the program may include a device identifier, user identifier, etc. operably association with the device and/or user. In this manner, a user may couple the DICD, device, etc. to a personal computer and the program may initiate communication with a network allowing a user to obtain unique access to a network location if needed. As such, a system may communicate with a network for transferring image information, process information, databases, text files, etc. associated with the DICD to a network destination. In one embodiment, upon finishing transferring information, the program of instructions may remove itself and/or associated information from the personal computer upon finishing transferring the information thereby reducing residual data, images, programs, etc. from the system. In this manner, a user may couple the DICD, device, etc. to more than one system and without having a resident program on each system operable to enable transfer of information to a network location.

Upon communicating the image information and associated process reference, the method proceeds to step 304 where the image may be processed using the associated reference. Several embodiments as disclosed herein may be realized for subsequent processing. For example, the image information may include a reference identifying a DICD. As such, the method may determine a process associated with the DICD reference number and process the information based upon the identified DICD number. For example, a real-estate agent may desire to have images archived to a user defined network location. Additionally, the real-estate agent may want traditional prints created for the captured digital images. As such, the DICD reference may be used to identify several subsequent processes for processing communicated digital images. Upon processing the captured digital images using an associated reference, the method proceeds to step 305 where the method ends.

Figure 4:
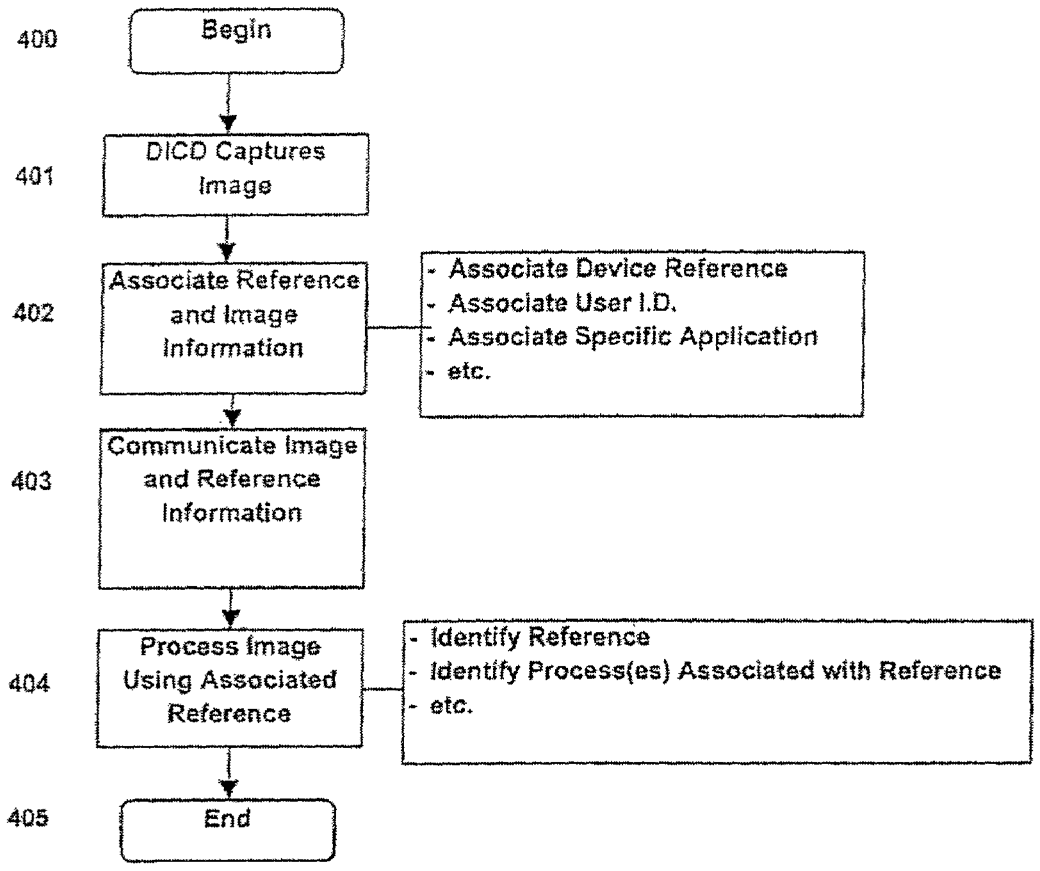
FIG. 4 illustrates a method for processing communicated image information using a reference according to one aspect of the present invention.

FIG. 4 illustrates a method for processing communicated image information using a reference according to one aspect of the invention. The method may be associated, in whole or in part, with a software routine operable to be deployed using the device illustrated in FIG. 1, the network illustrated in FIG. 2, or other systems, networks, or devices operable to use the method illustrated in FIG. 4.

The method begins generally at step 400. The method proceeds to step 401 where a digital image capturing device (DICD) captures a digital image. Upon capturing a digital image, the method proceeds to step 402 where a reference may be associated with a captured digital image. The reference may be a device identifier, user identifier, application identifier, etc. operable to be associated with the captured digital image. For example, if one or more users have access to the DICD, a reference identifying a user of the DICD may be associated with the image information and authenticated for a subscriber or user of a service and/or process prior to initiating processing of image and associated information. In this manner, a reference identifying specific user may be provided. Additionally, one or more processes may be associated with a specific user. For example, a specific user may configure a user profile for associating process references to captured digital images. In this manner, configurable user profiles may be used for several users allowing one or more user to use the DICD for capturing digital images for subsequent image processing.

In another embodiment, a DICD may be used in association with several different applications. A user may select a specific application and associate a reference to a captured image based upon a specific application. For example, an insurance agent may select a reference for a "new homeowner's policy" application for a captured digital images of a house. In a similar manner, an insurance agent may also select a "claims" application for recording digital images of storm damages for a property. Additionally, the insurance agent may select a reference for "personal use" thereby allowing the agent to use the camera for personal use. In this manner, a reference for a specific application may be associated with the captured digital image and subsequent processing provided. For example, the agent may desire to have traditional prints made for personal use. As such, traditional prints for the captured images may be provided and subsequent billing information associated with processing the images may be forwarded to the agent.

Upon associating a reference, the method proceeds to step 403 where the image information including an associated reference may be communicated to a network. The method then proceeds to step 404 where the method processes the image using the associated reference(s). For example, one or more references may be associated with the image information. As such, communicated image information may be processed using the associated reference. For example, a reference for a specific user may be associated with a captured digital image. As such, the method may access a user profile that may include user specified processes for processing communicated digital images. For example, a specific user may capture images using the DICD and a website for displaying captured image information may be generated/updated. As such, a user profile may include processing information, such as a specific network address, for communicating the images and eventual updating/generation of a website. Additionally, the user may want to email another party a copy of the captured digital image. As such, a user may customize processing of captured digital images as desired. Other processing may be used without departing from the spirit and scope of the present invention. Upon processing the communicated digital images, the method proceeds to step 405 where the method ends.

Figure 5:
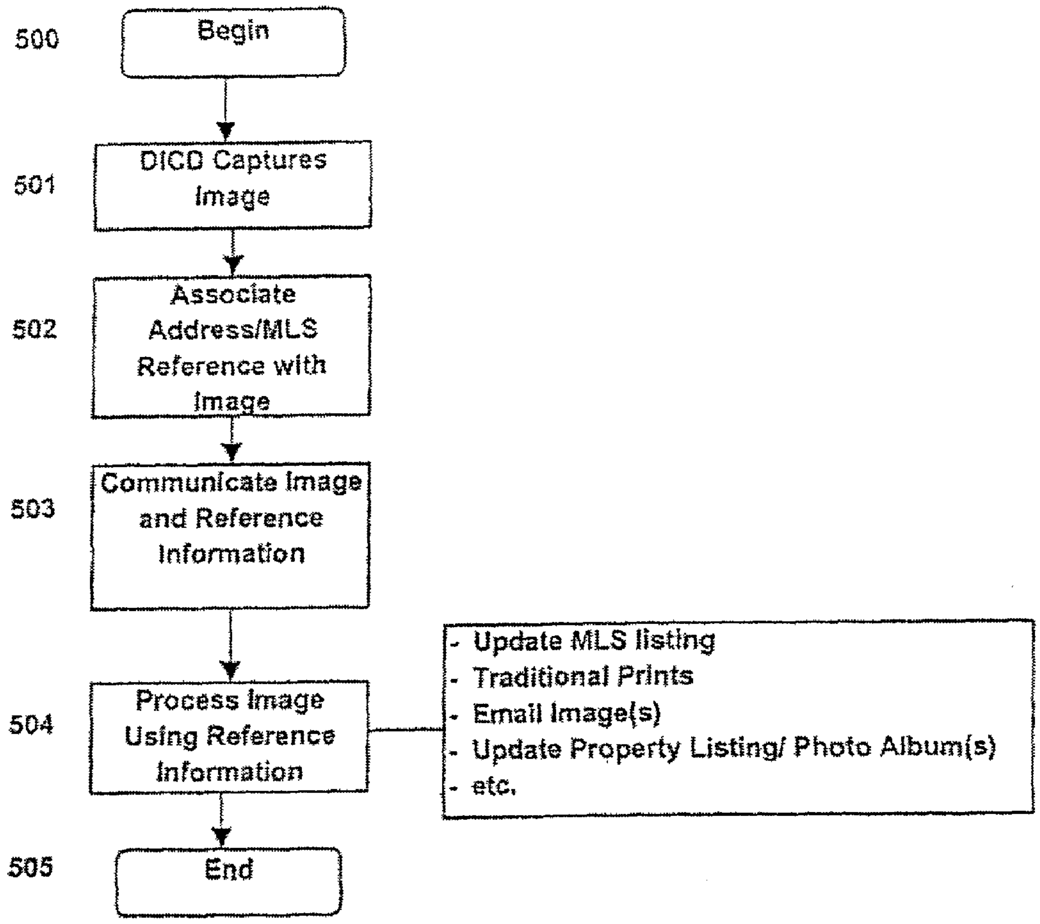
FIG. 5 illustrate a method for providing real estate information with image information according to one aspect of the invention.

FIG. 5 illustrate a method for providing real estate information with image information including associated processing information according to one aspect of the invention. The method may be associated, in whole or in part, with a software routine operable to be deployed using the device illustrated in FIG. 1, the network illustrated in FIG. 2, or other systems, networks, or devices operable to use the method illustrated in FIG. 5. The method of FIG. 5 illustrates a one example for associating a reference with a image information and should not limited to use within the real estate industry. Other industries may also use associating a specific reference with image information.

The method begins generally at step 500. The method proceeds to step 501 when a digital image capturing device (DICD) captures a digital image. The method then proceeds to step 502 when a user, such as a real estate professional, associates a reference such as a street address, an MLS listing number, an inventory number, an agent's name/number, or other references with a captured image. Upon associating a reference with the captured image, the method proceeds to step 503 where the image and associated reference may be communicated to a network for processing. The information may be communicated in one or more ways without departing from the scope of the invention.

The method then proceeds to step 504 where the method processes the image information using the associated reference. For example, an MLS number may be associated with the image information. As such, the image information may be communicated to a server and one or more listing associated with the MLS number may be updated. For example, several websites listing the specified MLS number may be operable to display or provide a specific listing. As such, image information for the specified MLS number may be communicated to one or more network locations and/or listings thereby providing efficient communication of image information for listed properties.

In a similar manner, other processing may be desired by a user. For example, a real estate professional may tour several properties with one or more buyers and capture images having an associated property addresses, MLS numbers, etc. to identify a property. As such a reference identifying the property and client may be communicated with the image information and an associated process reference to a network. For example, a database may be provided in association with the image information and may include a clients name, process reference, property or listing information, a date toured, a preview parameter, a reference to a photo name, a note associated with the photo, or other information that may be associated with an image for processing the image.

As such, a network location may include a processing engine operable to process the image information and/or database into a desired format for the real estate professional. For example, traditional prints for each property may be created for the buyer. As such, a traditional print of each property may be created and mailed to the buyer for the buyers review. Other embodiments may include emailing the captured images to a desirable email account (i.e. agents, buyers, sellers, brokers, etc.). In another embodiment, an agent may want the image to be communicated to a specific network location operable to provide an on-line photo album of images. For example, the image information may he stored at a network location and a website for each homebuyer may be created/updated based on the images and information captured/provided by the homebuyer and/or agent. In this manner, a real estate professional may provide a portfolio of home tours for each homebuyer thereby allowing a homebuyer to review tours, manage tours, share tours with friends and family, email links to tours, delete tours, select favorite tours, chat on-line about home tours, access listing information, provide mortgage services, etc. As such, a real estate professional may not need to revisit homes with each homebuyer and/or family/friends to remember details of a specific home.

Upon processing the image information using the reference, the method proceeds to step 505 where the method ends. Other processes, references to processes, etc. may be used without departing from the scope of the present invention.

Figure 6:
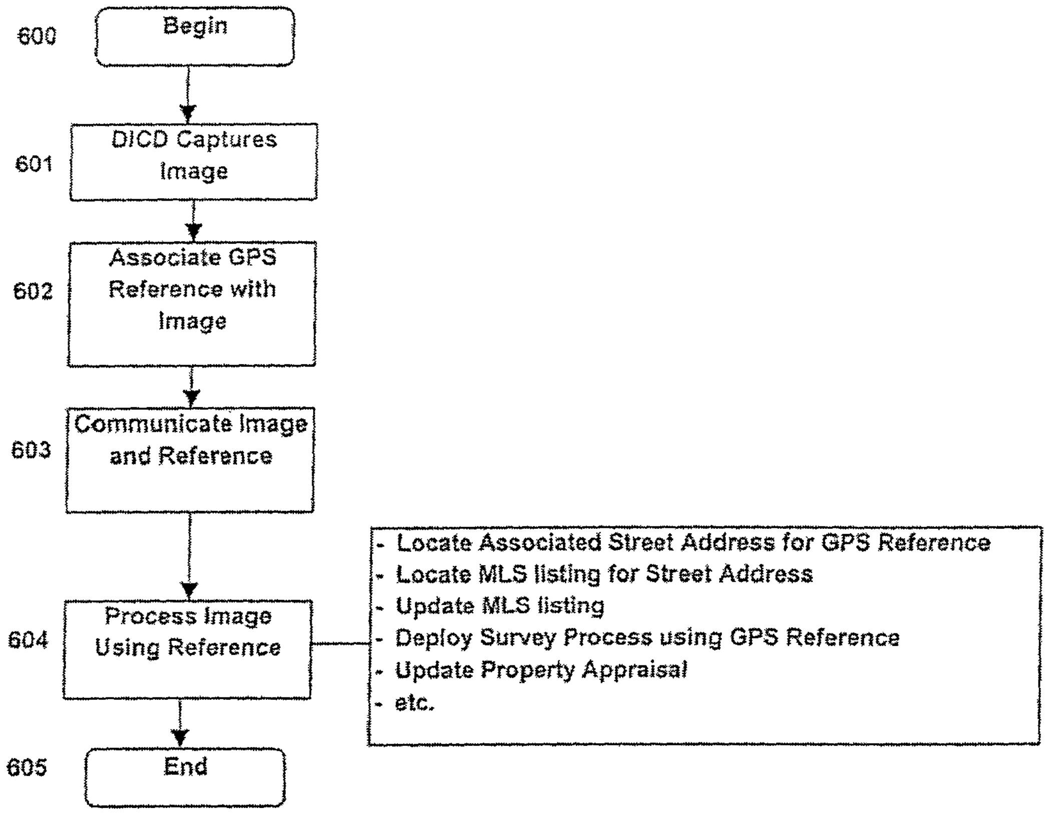
FIG. 6 illustrate a method for providing real estate image information and global position information according to one aspect of the invention.

FIG. 6 illustrate a method for providing real estate image information and global position information according to one aspect of the invention. The method may be associated, in whole or in part, with a software routine operable to be deployed using the device illustrated in FIG. 1, the network illustrated in FIG. 2, or other systems, networks, or devices operable to use the method illustrated in FIG. 6.

The method of FIG. 6 illustrates a specific example for associating a reference with a captured digital image and should not limited to use within a real estate industry. Other industries may take advantage of associating a specific reference with a captured digital image and the real estate industry is used to describe one application of the method of FIG. 6.

The method begins generally at step 600. At step 601, a digital image capturing device (DICD) captures a digital image. The method then proceeds to step 602 where a reference associated with a global position identifying the approximate location of the DICD when the DICD captured the image may be associated with the captured image. For example, a communication module, similar to the module described in FIG. 1, may provide a reference to a location before, during, and/or after and image is captured. As such, the DICD may request the location of the DICD and associate a global position with the captured image based upon the location of the DICD when the image was captured. In one embodiment, the reference may be provided by the DICD in response to determining the location. For example, GPS coordinates may be communicated to the DICD and associated with the captured digital image. In this manner, the image information and GPS coordinates may be communicated to a network for processing. In another embodiment, the coordinates associated with the global position of the DICD may be communicated to a network or server. Additionally, a reference may be associated with the captured image information and/or GPS coordinates such that upon communicating the image information the GPS coordinates may be used for processing the image information.

In another embodiment, a reference to the coordinates may be communicated to the DICD for the location of the captured image. As such, the DICD may associate the GPS reference with the captured image. Upon associating a GPS reference with the captured image, the method proceeds to step 603 where image information and the GPS reference (if located within the DICD) may be communicated to a network.

In this manner, GPS positions for captured digital images may be provided in one or more ways such that a GPS position may be used in association with processing image information.

The method then proceeds to step 604 where the method processes the image information using the GPS reference and/or coordinates. For example, the method may locate a street address or property address associated with the GPS reference and/or coordinates. As such, image information for specific street address or property address may be processed as desired thereby reducing user input and automating associating GPS locations with addresses of captured image information.

In another embodiment, a GPS reference for a captured image may be communicated to a network location operable to process the communicated reference. For example, the GPS reference may include a device identifier and/or an image identifier associated with the DICD. As such, the method may determine the DICD and image information communicated to the network may be processed using the GPS reference as desired.

In another embodiment, the method may determine a street address associated with the GPS reference. As such, the method may determine an MLS number associated with the street address and provide image information for one or more MLS listings using the located street address and/or MLS number.

In another embodiment, the method may be used to process survey information for a land surveyor. For example, image information having an associated GPS reference may be communicated to a network. As such, GPS coordinates may be used with the communicated image information to provide survey information.

In another embodiment, the method may be used in association with appraising real estate. For example, image information for an appraiser may be communicated to a network and processed using a GPS reference associated with a specific image. In one embodiment, the method may determine a street address/MLS number associated with the GPS reference. As such, the image information may be processed using the image information and associated street address/MLS number for appraising a property.

Upon processing the information, the method then proceeds to step 605 where the method ends. As stated above, several industries may benefit from providing a GPS reference in associated with a captured image. As such, the method of FIG. 6 should not be viewed in a limiting sense but to sight one example of providing a GPS reference in association with image information.

Figure 7:
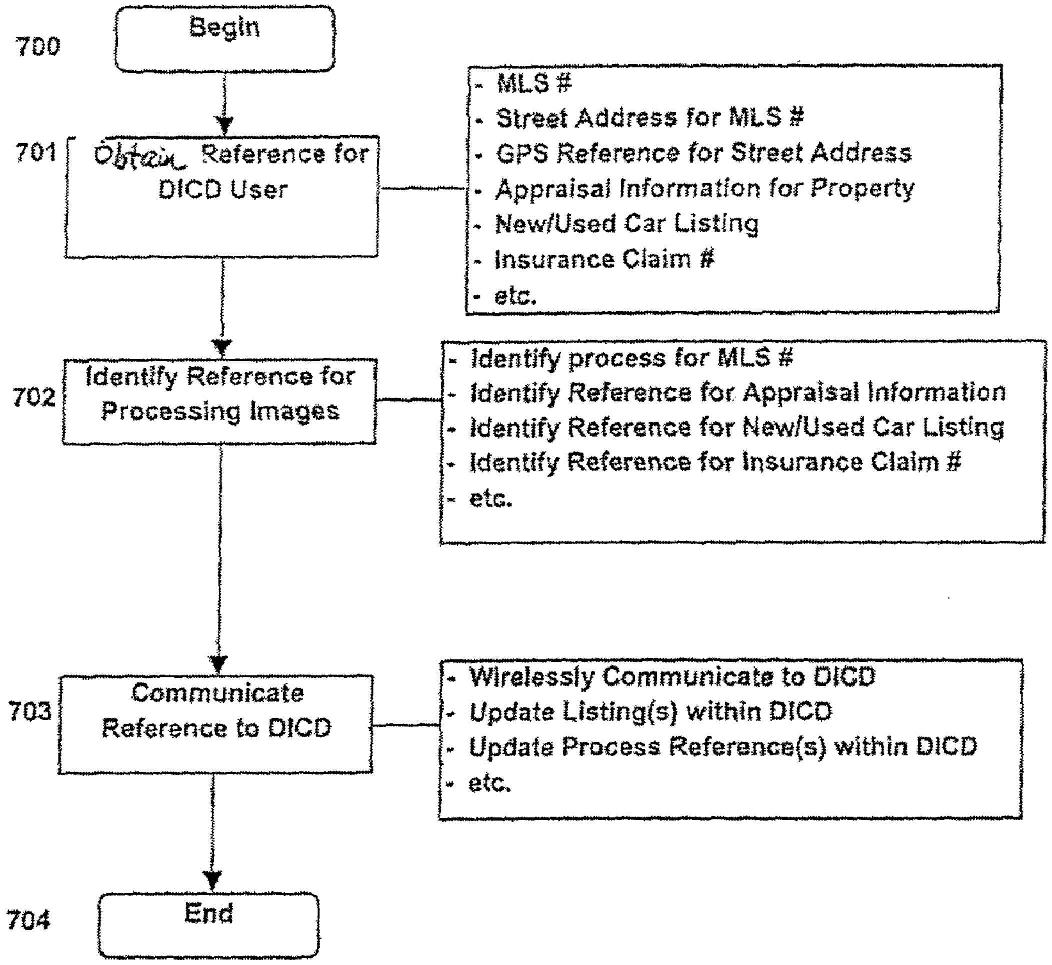
FIG. 7 illustrates a method for providing reference information for processing digital image information according to one aspect of the invention.

FIG. 7 illustrate a method for providing reference information for processing digital image information according to one aspect of the invention. The method may be associated, in whole or in part, with a software routine operable to be deployed using the device illustrated in FIG. 1, the network illustrated in FIG. 2, or other systems, networks, or devices operable to use the method illustrated in FIG. 7.

The method may be used to communicate information from a network to a communication device. In a preferred embodiment, the network may be associated with a wireless network and operable to communicate with a digital image capturing device (DICD). The method begins generally at step 700. At step 701 the method obtains a reference for a DICD user. For example, the DICD user may be a real estate agent and may be accessing a software application operable to enable the agent to update a database of property listings. For example, the method may capture information associated with a newly entered MLS listing. In a similar manner, the method may obtain a street address associated with a property or other information associated with the property. For example, a GPS coordinate for the newly entered listing may be determined.

In another embodiment, an property appraiser may enter a new property to be appraised. As such, the method may obtain information associated with the new property for associating image information with the new property. In another embodiment, information for new and used car listings may be captured for associating image information. For example, a user may enter a used car listing into a database and information associated with the used car listing may be obtained.

In another embodiment, an insurance agent may enter a claim or a new policy into a database. As such, information associated with the claim or new policy may be obtained for associating image information.

Upon obtaining a reference for a DICD user, the method proceeds to step 702 where the method identifies a reference for processing images. For example, the method may identify an MLS number and subsequent processing of image information for a specific MLS number. For example, a real estate agent may want to deploy several processes (i.e. email, update listing, archive, etc.) in association with a specific MLS number. As such, a real estate agent may customize the processes using a user interface operable to customize processing for MLS numbers.

The processes may be provided via a binary encoded word which may be communicated to a DICD identifying selectable processes for captured images. The binary word may be configured as follows:

| | | |
|---|---|---|
| (MSB) | Bit 1 = | Create traditional prints |
| | Bit 2 = | Copy image to MLS listing(s) |
| | Bit 3 = | Provide GPS reference |
| | Bit 4 = | Email image |
| | Bit 5 = | FTP image to network location |
| | Bit 6 = | Copy image to property photo album |
| | Bit 7 = | Archive image within agent's archive |
| (LSB) | Bit 8 = | Do nothing |

As such, a binary word or reference may be used to provide customizable processing. For example, the word '11100010' may be provided for creating traditional prints, copying images to MLS listing(s), providing a GPS reference, and archiving an image within an agent's archive. The above references may also be used in association with several other industries other than real estate and may include, but is not limited to, property appraisals, automobile listings, insurance markets, law enforcement, and other industries that may benefit from the method of FIG. 7.

Upon identifying a reference for processing, the method the proceeds to step 703 where the reference may be communicated to the user's DICD. For example, the reference may include one or more numbers representing MLS numbers for properties. As such, the reference may be wirelessly communicated to the DICD and copied into a storage medium operably associated with the DICD. The DICD may then display the MLS number(s) within a user interface operably associated with the DICD. In this manner, a user can scroll or access MLS listing numbers and associate a reference for a listing number to a captured image. As such, the captured image having a reference to an MLS number may be processed using the MLS number.

In another embodiment, the DICD may update listings stored within the DICD. For example, MLS numbers which may not be currently used or needed may be removed from the listing. As such, the listing may be updated to reflect current MLS listings as communicated.

In another embodiment, process references within the DICD may be updated. For example, new or old processes may be added or deleted as technology evolves. As described above, several processes may be added, deleted, enabled, disabled, by a user or service provider as desired. In this manner, references for processes may updated periodically and communicated to the user's DICD.

The above method advantageously provides a DICD user an automated solution for capturing and processing images. The method may capture a reference and identify a reference for processing images. The reference may be communicated to the DICD and the user may access the reference and associate the reference for subsequent image processing. For example, a real estate agent may enter several new properties for an MLS listing. The method may capture a reference for a new listing and communicate the reference to the agents DICD. An agent may then view a list of MLS numbers and associate an MLS number with a captured image of the specific property. The captured image may then be wirelessly communicated to a network for subsequent image processing. As such, an agent will no longer be required to manually upload images for processing images, updating MLS listings, updating on-line listings, etc.

Figure 8:
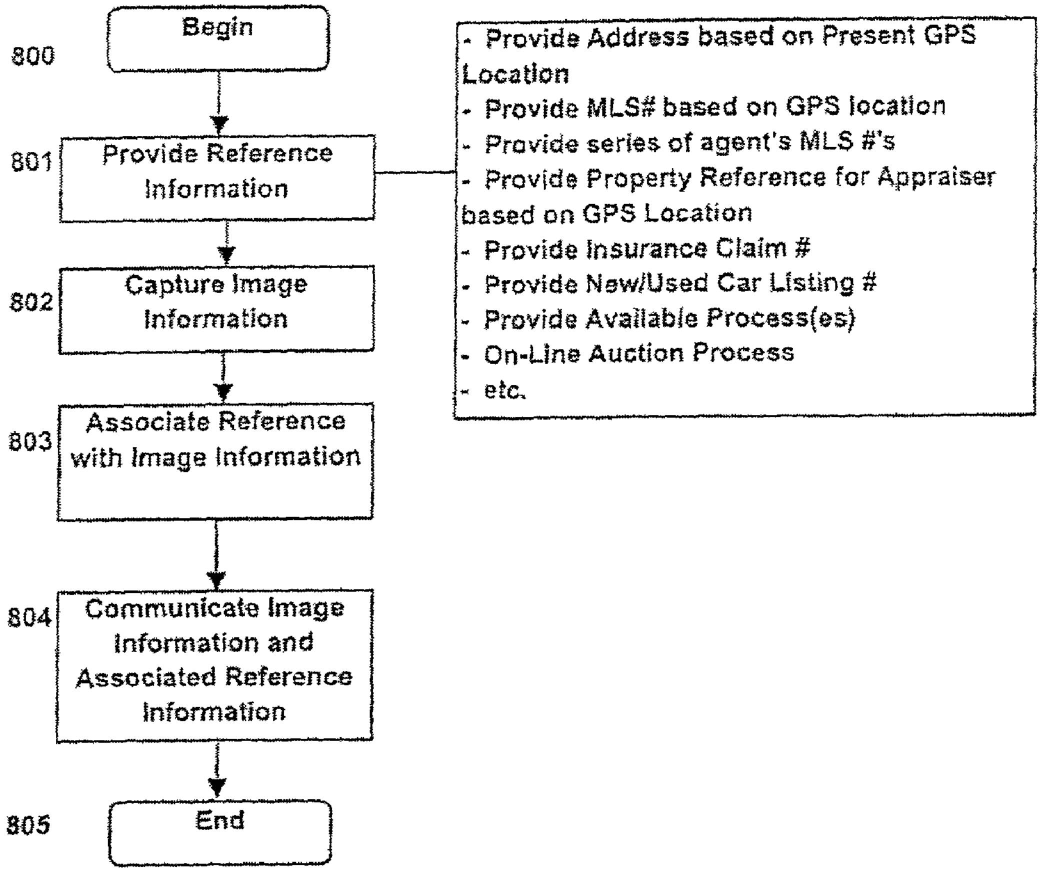
FIG. 8 illustrates a method for providing reference information operable to be associated with image information according for processing image information according to one aspect of the invention.

FIG. 8 illustrates another method for providing reference information for processing image information according to one aspect of the invention. The method may be associated, in whole or in part, with a software routine operable to be deployed using the device illustrated in FIG. 1, the network illustrated in FIG. 2, or other systems, networks, or devices operable to use the method illustrated in FIG. 8.

The method of FIG. 8 may be used to associate a reference with a captured image for subsequent image processing. The method begins generally at step 800. At step 801, reference information may be provided to a DICD user. For example, reference information may include providing an address based upon a present GPS location. A GPS location may be determined by the DICD and a reference for the GPS location may be provided. In one embodiment, the GPS location may be used to determine a physical address of the location of the DICD. As such, an address associated with the location of the DICD may be provided. In another embodiment, the method may determine an MLS number and associate information based upon the present location of the DICD device. For example, a GPS location of the DICD may be identified and an a physical address and associated MLS number may be provided to a user. Additionally, the method may determine the MLS listing information associated with the MLS number and provide the listing information (i.e. price, # bedrooms, square feet, # bathrooms, taxes, school district, image of the property, etc.) within a user interface associated with the DICD. For example, the DICD may communicate with a network such as the Internet to access property listings for a physical address. Additionally, the DICD may be operable to provide a browsing environment allowing the user to access other listings accessible via the Internet. In this manner, MLS listing information may be provided to a user without having to access a laptop or desktop computer system.

In another embodiment, the method may provide a reference for a property appraiser. For example, the DICD may include a list of addresses of the properties the appraiser will appraise. As such, the list may be provided to the user for appraising the property. In another embodiment, a property address may be determined based on a GPS location of the DICD device. As such, the method may determine the GPS location and further provide a property address associated with the location to the user via a user interface associated with the DICD. In this manner, a property appraiser may not need to provide a property location for captured images. Other references may include DICD I.D.'s, insurance claim #'s, insurance policy #'s, new/used car listing #'s, on-line auction reference Ps, or other references which may be provided for processing images.

Upon providing reference information, the method proceeds to step 802 where the user captures an image. The method then proceed to step 803 where the method associates a reference associated with processing the image with the captured image. The method then proceeds to step 804 where the image information and associated reference may then be communicated to a network. Upon communicating the image information and associating a reference, the method then proceeds to step 805 where the method ends.

Figure 9:
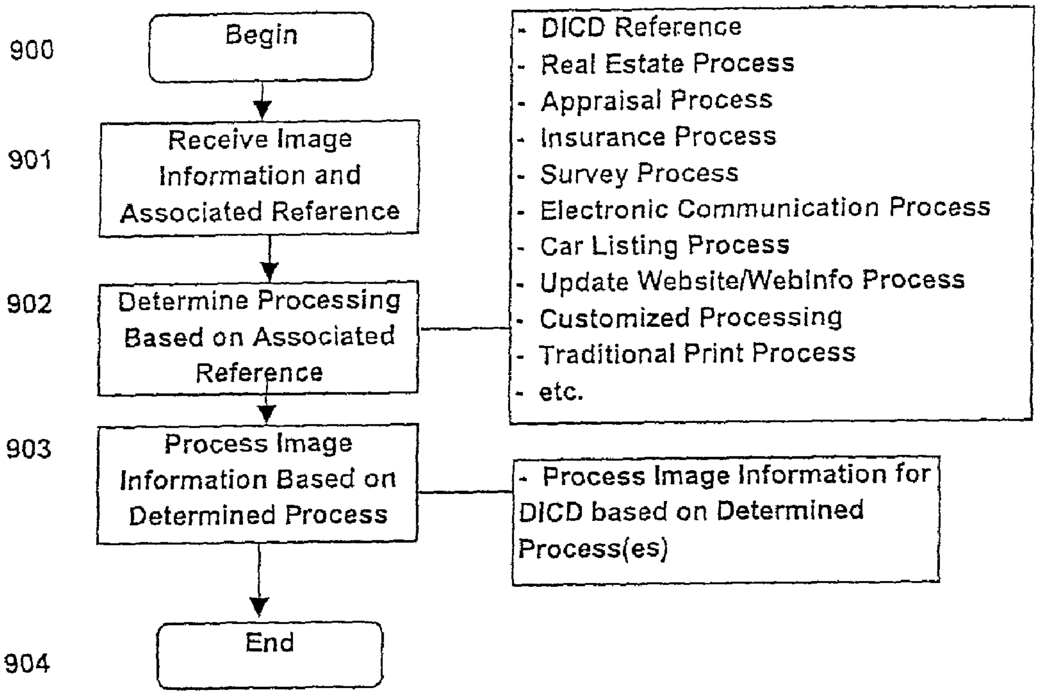
FIG. 9 illustrates a method for processing image information including associated process information according to one aspect of the invention.

FIG. 9 illustrates a method for processing image information including associated process information according to one aspect of the invention. The method may be associated, in whole or in part, with a software routine operable to be deployed using the device illustrated in FIG. 1, the network illustrated in FIG. 2, or other systems, networks, or devices operable to use the method illustrated in FIG. 9.

The method may be used to receive image information and a reference associated with a process for processing image information. The method begins generally at step 900. At step 901, the method receives image information and an associated reference for processing the image information. The information may be received in a one or more ways. For example, a wireless communication device may communicate the image information and an associated reference via a wireless network. The wireless network may be operable to communicated information via a wireless application protocol (WAP) enabled server. For example, the information may need to be converted into a format operable to be communicated via a network such as the Internet. As such the WAP server may translate the information into a format and communicate the information to an network address such as a process server where the information may be received.

In another embodiment, the image information having an associated process reference may be communicated via a land-line, wire-line, etc. For example, a digital image may be uploaded via a modem coupled to a phone jack, network connector, cable connector, etc. operable to communicate with a network such as the Internet. As such, the method may receive the image information and an associated reference and process the information accordingly.

Upon receiving the information, the method proceeds to step 902 where the method determines processing of the information based upon an associated reference. For example, the method may determine a reference, such as a device reference, associated with the image information. As such, the method may process the information based upon the device reference. For example, a user may purchase a DICD may be provided to a user for capturing images and processing images into traditional prints. A such, a reference identifying the DICD may be determined and the image information may be processed to provide traditional prints. For example, the image information may be configured into an XML file and may include the user's home address, phone number, delivery information etc. As such, the image information having an associated reference for processing may be used to create an XML file for providing traditional prints and delivery information for delivering the traditional prints to a physical address of the DICD user.

In other embodiments, communicated image information having reference information may include various other processes such as real estate processing, appraisal processing, insurance processing, surveyor processing, electronic communication processing, car listing processing, website/webinfo update processing, traditional print processing, customizable or user defined processing, on-line auction processing, law-enforcement processing, or other processes that may be used in association with capturing image information and associating a reference for processing the image information.

Upon determining processing, the method then proceeds to step 903 where the method processes the image information for the DICD based on the determined process or processes as described above. The method then proceeds to step 904 where the method ends.

Figure 10:
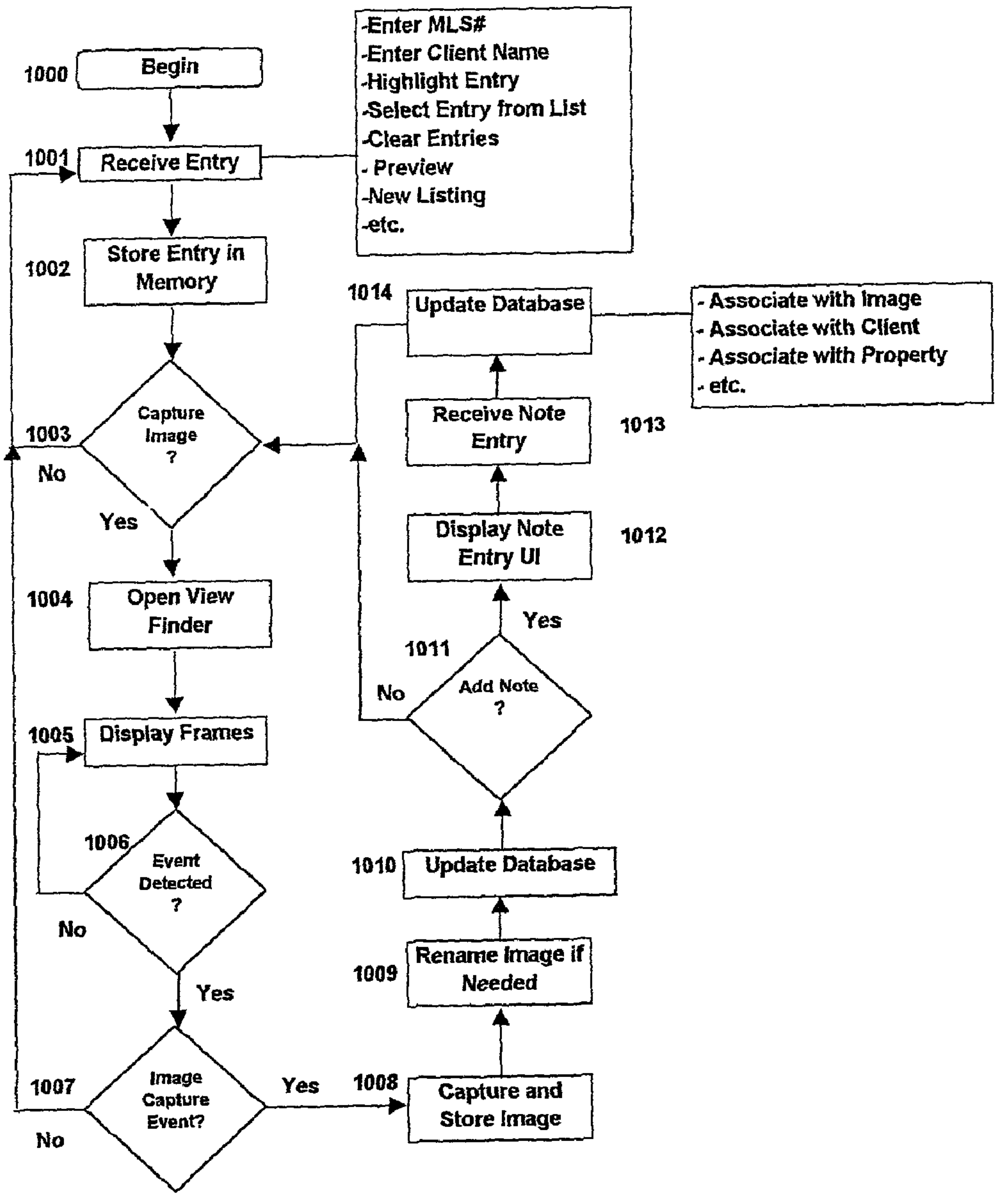
FIG. 10 illustrates a method for capturing image information and associated process information according to one aspect of the invention.

FIG. 10 illustrates a method for capturing image information and associated process information according to one aspect of the invention. The method may be associated, in whole or in part, with a software routine operable to be deployed using the device illustrated in FIG. 1, the network illustrated in FIG. 2, or other systems, networks, or devices operable to use the method illustrated in FIG. 9.

The method begins generally at step 1000. At step 1001, a entry is received in association with a property. For example, an entry may include an MLS number, a client name, a highlighted entry displayed within a user interface, an entry selected from a list, an input to clear entries and manually enter a value, a property preview entry, a new or current listing entry, or other entries that may be used in association with a property.

Upon receiving the entry, the method proceeds to step 102 where the entry is stored in memory such as a database, as a variable, or as other data types that may be stored within memory. The method then proceeds to step 1003 where the method determines if an image is to be captured. If an image is not to be captured, the method repeats at step 1001. If an image is to be captured, the method proceeds to step 1004 where a view finder associated with a camera is opened and frames associated with a target are displayed 1005. If an event is detected 1006, the method proceeds to step 1007 where the method determines if an image capture event has been selected. If an image capture event has not been selected, the method proceeds to step 1001 and repeats. If a method has been detected, the method proceeds to step 1008 where and image is captured and stored within memory and to step 1009 where the image is renamed if needed. The method then proceeds to step 1010 where a database is updated with information associated with an image and to step 1011 where the method queries a user to add a note. If a note is to be added, the method proceeds to step 1012 where a note entry user interface (UI) is displayed and to step 1013 where the note is received upon entry. The method then proceeds to step 1014 where the note is entered into memory and may be associated with an image, client, property, agent, etc.

The method then proceeds to step 1003 and repeats. In this manner, a client, agent, user, etc. may capture image information and associate image additional information with a captured image for subsequent processing. For example, subsequent processing may include, but are not limited to, providing on-line tours for clients, generating listing information and associated image information, creating on-line listings, creating flyers, distributing listing information including image information and process information, and/or other processes that may be used to enhance a real estate transaction.

Wireless communication of information associated with digital images may be provided in a one or more ways. Some examples of wireless communication systems and protocols operable to be used with the invention are provided below and may include, but are not limited to, CDMA, GSM, TDMA, PCS, UMTS, and GPS. A brief description of some wireless communication technologies that may be used with the invention are described below.

Wireless refers to a communications, monitoring, or control systems in which electromagnetic or acoustic waves carry a signal through atmospheric space rather than along a wire. In most wireless systems, radio-frequency (RF) or infrared (IR) waves are used. Wireless transceivers are available for connection to portable and notebook computers, allowing Internet access in selected cities without the need to locate a telephone jack.

CDMA (Code-Division Multiple Access)

CDMA, one of the three wireless telephone transmission technologies, takes an entirely different approach from GSM and the similar TDMA. CDMA, after digitizing data, spreads it out over the entire bandwidth it has available. Multiple calls are overlaid over each other on the channel, with each assigned a unique sequence code. The digital wireless personal communication service (PCS) is expected to use CDMA widely in the United States.

GSM (Global System for Mobile communication)

GSM (Global System for Mobile communication) is a digital mobile telephone system that is widely used in Europe and other parts of the world. GSM uses a variation of time division multiple access (TDMA) and is the most widely used of the three digital wireless telephone technologies (TDMA, GSM, and CDMA). GSM digitizes and compresses data, then sends it down a channel with two other streams of user data, each in its own time slot. It operates at either the 900 MHz or 1800 MHz frequency band. GSM is the de facto wireless telephone standard in Europe. GSM has over 120 million users worldwide and is available in 120 countries, according to the GSM MoU Association. Since many GSM network operators have roaming agreements with foreign operators, users can often continue to use their mobile phones when they travel to other countries. American Personal Communications (APC), a subsidiary of Sprint, is using GSM as the technology for a broadband personal communications service (PCS). The service will ultimately have more than 400 base stations for the palm-sized handsets and is part of an evolution of wireless mobile telecommunication that includes High-Speed Circuit-Switched Data (HSCSD), General Packet Radio System (GPRS), Enhanced Data GSM Environment (EDGE), and Universal Mobile Telecommunications Service (UMTS).

TDMA (Time Division Multiple Access)

TDMA (time division multiple access) is a technology used in digital cellular telephone communication to divide each cellular channel into three time slots in order to increase the amount of data that can be carried. TDMA is used by Digital-American Mobile Phone Service (D-AMPS), Global System for Mobile communications (GSM), and Personal DigitalCellular (PDC). However, each of these systems implements TDMA in a somewhat different and incompatible way. An alternative multiplexing scheme to FDMA with TDMA is code division multiple access (CDMA), which takes the entire allocated frequency range for a given service and multiplexes information for all users across the spectrum range at the same time.

PCS (Personal Communications Services)

PCS (personal communications services) is a wireless phone service somewhat similar to cellular telephone service but emphasizing personal service and extended mobility. It's sometimes referred to as digital cellular (although cellular systems can also be digital). Like cellular, PCS is for mobile users and requires a number of antennas to blanket an area of coverage. As a user moves around, the user's phone signal is picked up by the nearest antenna and then forwarded to a base station that connects to the wired network. The phone itself is slightly smaller than a cellular phone. PCS is being introduced first in highly urban areas for large numbers of users.

The "personal" in PCS distinguishes this service from cellular by emphasizing that, unlike cellular, which was designed for car phone use with transmitters emphasizing coverage of highways and roads, PCS is designed for greater user mobility. It generally requires more cell transmitters for coverage, but has the advantage of fewer blind spots. Technically, cellular systems in the United States operate in the 824-849 megahertz (MHz) frequency bands; PCS operates in the 1850-1990 MHz bands. Several technologies are used for PCS in the United States, including Cellular Digital Packet Data (CDPD) and Global System for Mobile (GSM) communication. GSM is more commonly used in Europe and elsewhere.

UMTS (Universal Mobile Telecommunications System)

UMTS (Universal Mobile Telecommunications System) is a so-called "third-generation (3G)," broadband, packet-based transmission of text, digitized voice, video, and multimedia at data rates up to and possibly higher than 2 megabits per second (Mbps), offering a consistent set of services to mobile computer and phone users no matter where they are located in the world.

Based on the Global System for Mobile (GSM) communication standard, UMTS, endorsed by major standards bodies and manufacturers, is the planned standard for mobile users around the world by 2002. Once UMTS is fully implemented, computer and phone users can be constantly attached to the Internet as they travel and, as they roam, have the same set of capabilities no matter where they travel to. Users will have access through a combination of terrestrial wireless and satellite transmissions. Until UMTS is fully implemented, users can have multi-mode devices that switch to the currently available technology (such as GSM 900 and 1800) where UMTS is not yet available.

Present cellular systems are mainly circuit-switched, with connections always dependent on circuit availability. Packet-switched connection, using the Internet Protocol (IP), means that a virtual connection may always be available to any other end point in the network. It will also make it possible to provide new services, such as alternative billing methods (pay-per-bit, pay-per-session, flat rate, asymmetric bandwidth, and others). The higher bandwidth of UMTS also promises new services, such as video conferencing. UMTS promises to realize the Virtual Home Environment (VHE) in which a roaming user can have the same services to which the user is accustomed when at home or in the office, through a combination of transparent terrestrial and satellite connections. The spectrum for UMTS has been identified as frequency bands 1885-2025 MHz for future IMT-2000 systems, and 1980-2010 MHz and 2170-2200 MHz for the satellite portion of UMTS systems.

As advancements in technology evolve, and other industries emerge, other references may be provided for providing subsequent image processing of digital images without departing from the spirit and scope of the present invention. For example, other industries may include, but are not limited to health care, insurance, construction, industrial manufacturing, advertising, web maintenance, law enforcement, or other industries that may use or desire to use automated processing of image information. Although the disclosed embodiments have been described in detail, it should be understood that various changes, substitutions and alterations can be made to the embodiments without departing from their spirit and scope.

What is claimed is:

1. A method of processing a digital image using a portable digital image capturing device, the method comprising:

detecting a user selection of a first function to communicate a first digital image over a wireless network to a first destination;

determining a first end use process reference in response to the user selecting the first function, wherein the first end use process reference includes a predetermined end use output format of the first destination;

detecting a selection of the first digital image at the portable digital image capturing device;

determining an image format size of the first end use process reference to display the processed image using a predetermined image format size of the first destination;

initiating a processing of the first digital image using the first end use process reference to form a first processed digital image at the portable digital image capturing device; and in response to identifying the user, initiating a first communication of the processed digital image over the wireless network communicatively coupled to the first destination using the first function such that the first destination may display the processed digital image using the predetermined end use output format.

2. The method of claim 1 further comprising:

determining an image compression size of the first end use process reference; and processing the first digital image using the image compression size to form the processed digital image in response to initiating the processing of the first digital image using the first end use process reference.

3. The method of claim 1 further comprising:

determining a subscriber unit functionality of the portable digital image capturing device using a subscriber system application;

enabling at least one digital image process function of the portable digital image capturing device in response to determining the subscriber unit functionality, the at least one digital image process function configured to access the end use process reference to initiate a processing of a captured digital image; and enabling a non-digital image process function of the portable digital image capturing device in response to determining the subscriber unit functionality.

4. The method of claim 1 further comprising:

determining a profile of the portable digital image capturing device;

enabling access to at least one function using the profile; and processing the first digital image in response to a user selecting the at least one function enabled using the profile.

5. The method of claim 1 further comprising:

detecting a first user profile of the portable digital image capturing device;

enabling the first function using the first user profile;

detecting a second user profile of the portable digital image capturing device; and enabling a second function using the second user profile, the second function different than the first function.

6. The method of claim 1 further comprising:

determining a device identifier of the portable digital image capturing device; and communicating the device identifier and the first processed digital image to the first destination, the device identifier operable to be used at the first destination to access the first processed digital image.

7. The method of claim 1 further comprising:

determining an application identification reference of the first function;

determining a device identifier of the portable digital image capturing device; and communicating the application identification reference and the device identifier with the processed digital image to the destination.

8. The method of claim 1 further comprising:

determining a subscription based service;

authenticating a user of the portable digital image capturing device;

accessing a website using the portable digital image capturing device in response to the authenticating the user;

receiving a selection of the first digital image to upload using the subscription based service; and uploading the first digital image to the website.

9. The method of claim 1 wherein the portable digital image capturing device is a wireless telephone.

10. The method of claim 9 wherein the wireless telephone communicates using Global System for Mobile communication.

11. The method of claim 10 wherein the first digital image is a video image.

12. The method of claim 1 wherein identifying the user is done by the portable digital image capturing device.

13. The method of claim 1 wherein identifying the user is done by the first destination.

14. A portable digital image capturing device operable to record a first digital image, comprising:

an image input sensor operable to record the first digital image;

a memory operable to store the first digital image;

a processor coupled to the memory, the processor operable to:

detect a user selection of a first function to communicate the first digital image over a wireless network to a first destination operable to display digital images;

determine a first end use process reference in response to the user selecting the first function, wherein the first end use process reference includes a predetermined end use output format of the first destination;

detect a selection of the first digital image at the portable digital image capturing device;

determine an image format size of the first end use process reference to display the processed image using a predetermined image format size of the first destination;

initiate a processing of the first digital image using the first end use process reference to form a first processed digital image at the portable digital image capturing device; and in response to identifying the user, initiate a first communication of the processed digital image over a wireless network communicatively coupled to the first destination using the first function such that the first destination may display the processed digital image using the predetermined end use output format.

15. The portable electronic device of claim 14 further comprising wherein:

a subscriber unit system software application operable to enable access to a second digital image processing application received by the wireless communication module; and the wireless communication module operable to receive the second digital image processing application via the wireless communication medium.

16. The portable electronic device of claim 15, further comprising:

a first digital image processing function accessible using the first digital image processing application;

a second digital image processing function accessible using the second digital image processing application; and the wireless communication module operable to communicate the first processed digital image over the wireless communication medium.

17. The portable electronic device of claim 15, further comprising a wireless telephone.

18. The portable electronic device of claim 17, further comprising a Bluetooth communication module.

19. The portable device of claim 14, wherein:

the processor is further operable to receive a selection of an email address;

the processor is further operable to formulate a mark-up language encoded file including a reference to the first digital image; and the first communication includes the email address and the mark-up language encoded file.

20. The portable device of claim 14, further comprising:

a first image capture function button;

an image magnification function operable to magnify a view of the first digital image;

an email function operable to be accessed using a graphical user interface;

an image upload function operable to be accessed using the graphical user interface; and a pointing device selector operable to:

enable selection of the first function;

enable selection of the email function;

enable selection of the upload function; and enable selection of the first digital image.

21. The portable device of claim 14 wherein the portable digital image capturing device is a wireless telephone.

22. The portable device of claim 21 wherein the wireless telephone communicates using Global System for Mobile Communication.

23. The portable device of claim 22 wherein the first digital image is a video image.

24. The portable device of claim 14 wherein identifying the user is done by the portable digital image capturing device.

25. The portable device of claim 14 wherein identifying the user is done by the first destination.

* * * * *